United States Patent [19]

Kao

[11] Patent Number: 5,345,382
[45] Date of Patent: Sep. 6, 1994

[54] CALIBRATION METHOD FOR A RELATIVE HEADING SENSOR

[75] Inventor: Wei-Wen Kao, Fremont, Calif.

[73] Assignee: Zexel Corporation, Tokyo, Japan

[21] Appl. No.: 883,859

[22] Filed: May 15, 1992

[51] Int. Cl.$^5$ ............................................. G01C 17/38
[52] U.S. Cl. ................ 364/424.01; 364/457; 364/571.05; 33/356
[58] Field of Search ............... 364/443, 449, 450, 453, 364/454, 457, 571.01, 571.02, 571.03, 571.05, 424.01, 447; 33/355 R, 356, 357, 358, 359, 361, 362

[56] References Cited

U.S. PATENT DOCUMENTS

| | | | |
|---|---|---|---|
| 4,416,067 | 11/1983 | Scherer et al. | 33/356 |
| 4,611,293 | 9/1986 | Hatch et al. | 364/571.03 |
| 4,660,161 | 4/1987 | Okada | 33/356 X |
| 4,672,565 | 6/1987 | Kuno et al. | 364/571.04 |
| 4,673,878 | 6/1987 | Tsushima et al. | 324/226 |
| 4,734,863 | 3/1988 | Honey et al. | 364/449 |
| 4,751,783 | 6/1988 | Ina et al. | 33/361 |
| 4,797,841 | 1/1989 | Hatch | 364/571.04 |
| 4,831,563 | 5/1989 | Ando et al. | 364/571.05 |
| 4,852,012 | 7/1989 | Suyama | 364/449 |
| 4,862,398 | 8/1989 | Shimizu et al. | 364/571.05 |
| 4,862,594 | 9/1989 | Schierbeek et al. | 33/356 |
| 4,890,233 | 12/1989 | Ando et al. | 364/457 |
| 5,046,031 | 9/1991 | Wanous | 364/571.02 |
| 5,165,269 | 11/1992 | Nguyen | 33/356 X |
| 5,172,322 | 12/1992 | Takano et al. | 364/449 |
| 5,182,872 | 2/1993 | Dufour | 33/356 |

OTHER PUBLICATIONS

R. L. French, "MAP Matching Origins Approaches and Applications," Rober L. French & Associates, 3815 Lisbon St., Suite 201, Fort Worth, Texas 76107, USA, pp. 91–116. No date.

Primary Examiner—Thomas G. Black
Assistant Examiner—Collin W. Park
Attorney, Agent, or Firm—Townsend and Townsend Khourie and Crew

[57] ABSTRACT

The invention provides a direction sensor and a method of calibrating a direction sensor having a relative heading sensor and an absolute heading sensor. The method allows calibration of both the relative heading sensor and the absolute heading sensor at the same time, by taking advantage of the known angular relationship between maxima and minima on the measurement curve of the absolute heading sensor. Such maxima and minima are found by rotating the sensors through an angle of at least 360°, reading the absolute and relative heading sensor outputs at numerous points and comparing each successive output. The relative heading sensor output at the minimum is subtracted from that at the maximum, and the difference divided by the known angle to arrive at a conversion constant for the relative heading sensor. The center and radii of the measurement curve of the absolute heading sensor may be found by determining the maxima and minima of the curve in two perpendicular directions.

14 Claims, 9 Drawing Sheets

CALIBRATION METHOD FOR A RELATIVE HEADING SENSOR

BACKGROUND OF THE INVENTION

The present invention relates generally to direction sensors for route guidance systems for vehicle navigation and more specifically, to calibration of a relative heading sensor such as a gyroscope.

Frequently, route guidance systems navigate using dead-reckoning, wherein a vehicle's current position is determined by considering a known previous position of the vehicle and the direction and distance travelled since the previous position. In such dead-reckoning systems, it is necessary to track the heading or direction of the vehicle relative to a reference direction. Usually, such systems utilize both an absolute heading sensor, such as a magnetic compass or geomagnetic sensor, for sensing vehicle heading relative to a reference direction fixed with respect to the earth, as well as a relative heading sensor, such as a gyroscope, for sensing vehicle heading relative to a previous vehicle heading, i.e., the change in vehicle heading.

In automobile route guidance systems, the accuracy of such heading sensors can be significantly influenced by a number of factors. For example, the presence of local magnetic fields can significantly affect magnetic compass readings. Such local magnetic fields are created by, for example, mechanisms in the vehicle in which the compass is carried, other vehicles in the vicinity, or nearby structures. Without periodic calibration to compensate for local effects, a magnetic compass will produce heading readings with significant error.

A geomagnetic sensor typically has two outputs from two separate windings which produce X and Y component signals corresponding to the Earth's magnetic field in two directions at right angles from each other. Ideally, if one was to plot the sensor's X and Y outputs at every point as the geomagnetic sensor is turned in a complete circle, the output would be a perfect circle such as shown in FIG. 4. Thus, the direction a vehicle is pointing can be determined by comparing the X and Y coordinates output from the sensor to the center of the circle. In practice, however, the circle typically becomes an ellipse such as shown in FIGS. 5 or 6, due to effects discussed above.

Relative heading sensors, such as gyroscopes, also require periodic calibration. Typically, two constants are critical in determining a relative heading from such a sensor. One is the sensor output at a reference or zero position, commonly called the "zero reading". The zero reading is subject to change with operating temperatures and other environmental factors. An inaccurate zero reading will cause all relative heading readings to be displaced from the actual relative heading by an amount equal to the error in the zero reading.

A second constant in relative heading sensors is the conversion factor between the output signal of the sensor and the relative heading. Like the zero reading, this conversion factor is subject to the influence of temperature and other environmental factors, and may have an even more profound effect upon the accuracy of the sensor. For example, a 10% error in the conversion factor would result in a 10% error in all relative heading measurements, regardless of magnitude. It has been found that errors in zero reading and conversion factor produce significant inaccuracies in heading measurement in automobile navigation systems.

It has been recognized, therefore, that the absolute and relative heading sensors used in automobile guidance systems must be calibrated regularly and accurately. On method for compensating for the magnetic compass or geomagnetic sensor output is shown in U.S. Pat. Nos. 4,611,293 and 4,797,841. Upon entering a vehicle, the user triggers an input to put the system into calibration mode. The car is then turned in a complete circle, with the system recording the X and Y points as the car is turned through a complete circle. The X and Y outputs are recorded for all angles of the turn, and the maximum and minimum values of the X and Y outputs are determined to allow determination of the axes of the ellipse. The system then determines the difference between the points on the ellipse and a perfect circle for each output and uses these as a correction factor for that output. U.S. Pat. No. 4,072,565 suggests at col. 4, lines 15–19, that a separate sensor could be used to detect a revolution of the vehicle for such a calibration method.

Another method for calculating a geomagnetic sensor is to use the output from an angular rate sensor to provide a correction. Such systems are shown in U.S. Pat. Nos. 4,831,563 and 4,862,398. However, as is apparent from the above discussion, the angular rate sensor itself needs to be calibrated.

A conventional method of calibrating a relative heading sensor, such as a gyroscope, is to sample the sensor output when the vehicle is standing still to obtain a zero reading. Then, in order to calibrate the conversion constant, the sensor is placed on a turntable turning at a constant speed. The sensor output is compared with the speed, and the conversion factor is determined by dividing the speed by the gyroscope voltage output. However, this method of calibrating a relative heading sensor is not practical for vehicle navigation, since it would require removing the sensor and rotating it on a turntable. This method further requires specialized calibration (e.g. a turntable) equipment which may not be readily available.

Another approach to calibration of a relative heading sensor utilizes a pre-calibrated absolute heading sensor, such as a magnetic compass, mounted in a fixed position relative to the relative heading sensor. As the relative heading sensor is rotated, the difference between two headings recorded by the absolute heading sensor is compared with the heading displacement measured by the relative heading sensor in order to calculate a conversion factor. This method is advantageous where the relative heading sensor is mounted in a vehicle and cannot be easily removed. However, the method requires the use of a second sensor such as a compass, and the second sensor must be calibrated before the relative heading sensor may be calibrated.

For these and other reasons, a method of calibrating a relative heading sensor in a vehicle navigation system is desired which does not require additional calibration equipment or removal of the sensor from the vehicle. It would be further desirable if the calibration method allowed calibration of the relative heading sensor without requiring the use of a pre-calibrated absolute heading sensor. In particular, the calibration method should permit calibration of both a relative heading sensor and an absolute heading sensor at the same time and during the same procedure. Finally, the calibration method should be simple to perform in view of the frequency that such calibration is required in automobile navigation systems.

SUMMARY OF THE INVENTION

The present invention provides a method for simultaneously calibrating absolute and relative heading sensors. A user enters the vehicle and provides an input to the guidance system to put it in a calibration mode. The user then turns the vehicle in a complete circle. After the vehicle is started and before it turns, the system determines the zero reading of the relative heading sensor in the standard manner. As the vehicle rotates, the X and Y outputs of the geomagnetic sensor are examined and historical maximum and minimum values are recorded. The maximum and minimum values are updated if a new value is higher or lower, respectively. When the vehicle has turned completely in a circle, the recorded maximum and minimum values for the X and Y direction will be the points on the ellipse of FIGS. 5 or 6 which are the maximum and minimum values. The invention recognizes that the difference between the maximum and minimum in the X direction or in the Y direction is 180°. Thus, the conversion factor for the relative heading sensor is calibrated by applying 180° to the relative heading sensor outputs recorded at the same time as the maximum and minimum geomagnetic sensor outputs in one of the X or Y directions.

The present invention further improves on the calibration of the conversion factor by calculating the maximum and minimum values in both the X and Y directions, then averaging the two factors. At the same time, the geomagnetic sensor itself is calibrated using a standard elliptical-to-circle comparison method discussed in the Background above.

The method of the present invention recognizes that while the user is turning a circle to calibrate both sensors, an output of either sensor to determine when the circle has been completed will not be accurate since neither has been calibrated yet. Accordingly, the method requires that the vehicle be turned approximately 400° as determined by the relative heading sensor. This insures that at least 360° points are obtained, and no harm is done by the duplication of points since the plot for the geomagnetic sensor will simply retrace over portions of the ellipse already determined, and will not change the maximum and minimum values recorded.

The present invention provides a method of calibrating a relative heading sensor which has significant advantages over conventional calibration methods. The calibration method of the present invention does not require the use of additional calibration equipment such as turntables, and may be used to calibrate a heading sensor mounted in a vehicle without removing the sensor from the vehicle. The method further eliminates the need for a pre-calibrated sensor to assist in calibration. The method further allows both a relative heading sensor and an absolute heading sensor to be calibrated during the same series of steps. The calibration method is simple and requires little time to complete, allowing calibration to be performed frequently to maintain accurate heading readings for use in vehicle navigation.

A further understanding of the nature and advantages of the invention may be realized by reference to the remaining portions of the specification and the drawings.

DETAILED DESCRIPTION OF THE ILLUSTRATIVE EMBODIMENTS

The present invention provides a direction sensor and a method for calibrating a direction sensor with particular usefulness in vehicle navigation and route guidance systems.

Figure 1:
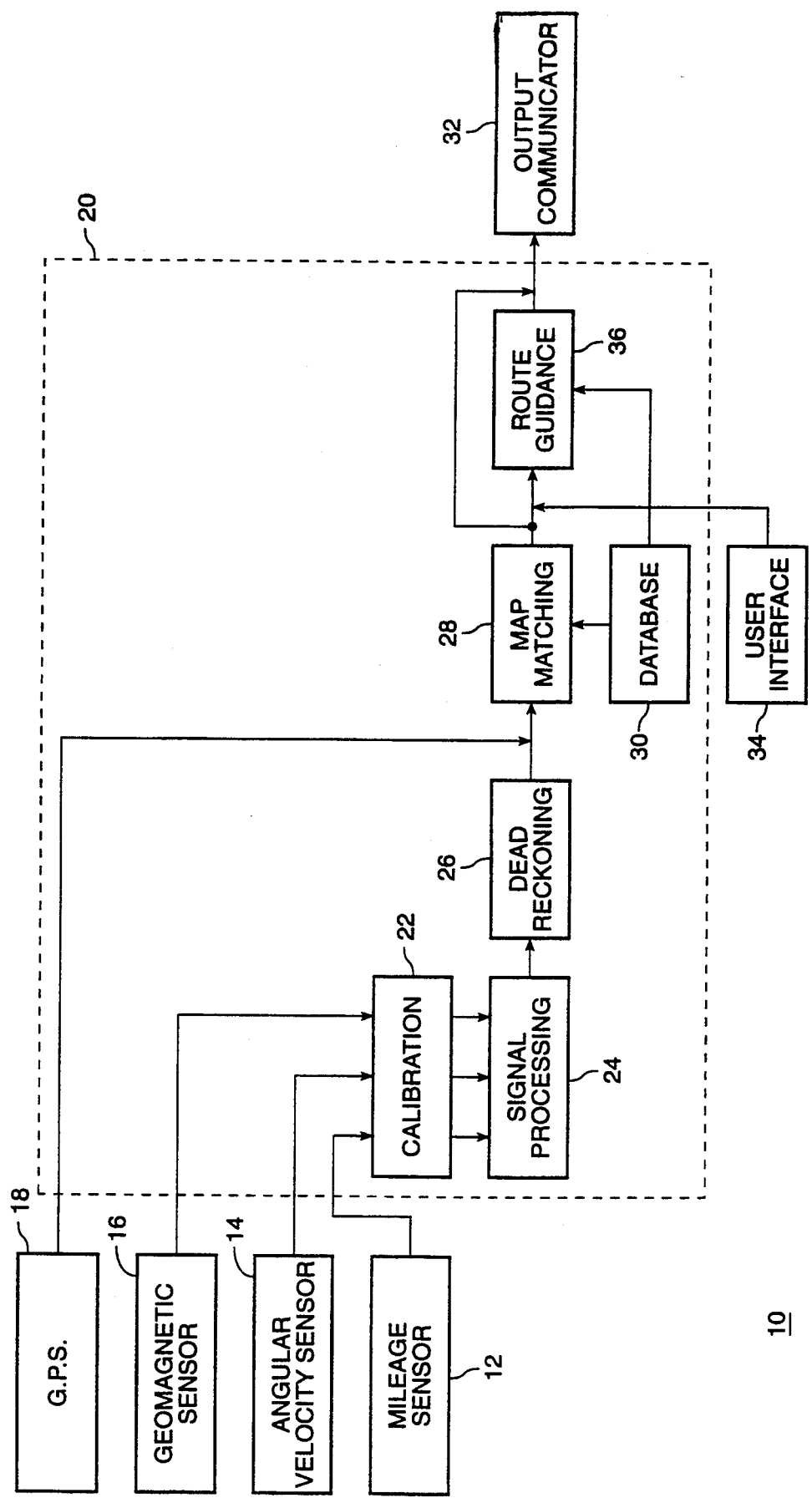
FIG. 1 is a schematic showing data flow in a route guidance system constructed in accordance with the principles of the present invention.

FIG. 1 illustrates an exemplary embodiment of a vehicle route guidance system. Guidance system 10 includes a plurality of sensors for providing positional data, including a mileage sensor 12, angular velocity (relative heading) sensor 14 and geomagnetic sensor 16. Usually, the angular velocity sensor comprises a gyroscope, but could comprise, for example, a differential odometer or other type of angular velocity sensor. The absolute heading sensor usually comprises a geomagnetic field sensor or compass. The system further includes a global positioning system (GPS) receiver 18 which receives position data such as latitude and longitude from, for example, a satellite-based navigation system.

Data from sensors 12 to 16 and GPS receiver 18 is input to computing means 20. The signals from sensors 12-16 are calibrated to adjust for error-producing discontinuities in calibration section 22. The sensor output signals are then processed in signal processing section 24, where the signals are filtered to arrive at one or more estimates of a vector representing vehicle travel since the last known position. Dead-reckoning means 26 then determines a best estimate of the vehicle position and transmits the position to map matching means 28. If it is preferred to utilize GPS data rather than data from sensors 12-16, data from GPS receiver 18 is input to map matching means 28. Database 30 contains data representing a map of the area in which the vehicle is traveling. The data may represent, for example, road segments, headings, average speeds, turn restrictions and other relevant information. Map matching means 28 compares the position determined by dead-reckoning means 26 or input from GPS receiver 18 with the map data in database 30 to determine the location of the vehicle on the map. The vehicle position may then be transmitted to output communication means 32 to communicate to the user the position of the vehicle relative to the map.

The system further provides route guidance capability wherein the user inputs a desired destination through user interface 34, commonly comprising a keyboard. The computing means 20 then calculates the optimum route from the current position of the vehicle to the desired destination. Route guidance means 36 determines the optimum route, including, for example, the most appropriate roadways to follow, where turns should be made, and distance to destination, using map data in database 30. The proper route is then communicated to the user through output communication means 32, which may comprise a screen display, audio speaker, or other means of communication.

Figure 2:
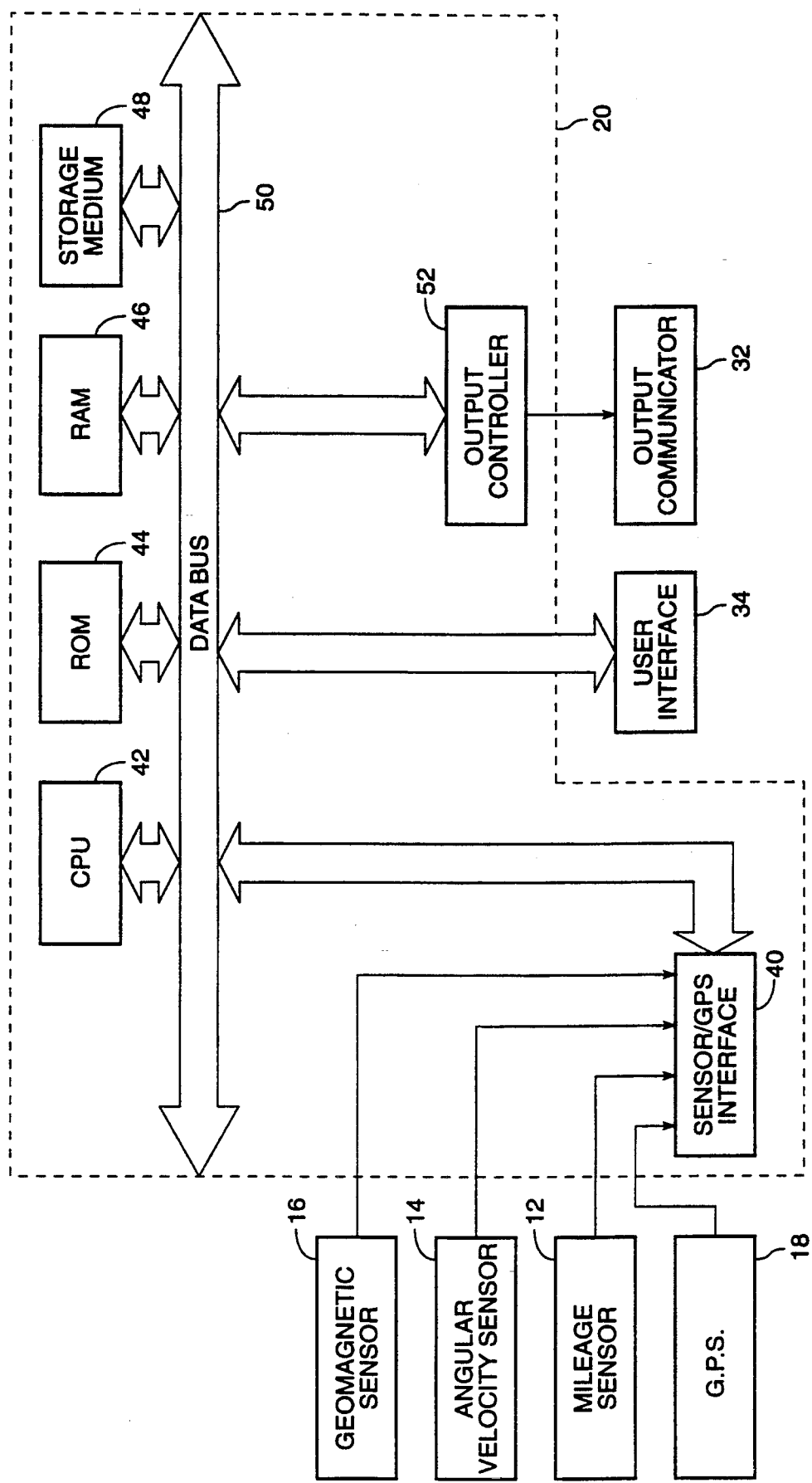
FIG. 2 is a schematic of a route guidance system constructed in accordance with the principles of the present invention.

FIG. 2 schematically illustrates an exemplary embodiment of the hardware of computing means 20. Sensors 12–16 and GPS receiver 18 are coupled to computing means 20 through sensor/GPS interface 40. Data from interface 40 is transmitted to CPU 42, which performs the calibration, signal processing, dead-reckoning, map matching and route guidance functions described above. Database 30 may be stored in storage medium 48, with software directing the operation of computing means 20 stored in ROM 44 for execution by CPU 42. RAM 46 permits reading and writing of the information necessary to execute such software programs. Storage medium 48 may comprise a hard disk drive, CD-ROM or IC onto which digitized map information has been stored. Output controller 52, which may comprise a graphics controller for a display screen, receives data processed by CPU 42 and transmits such data to output communicator 32, usually comprising a display screen. The user may input data, such as a desired destination, through user interface 34, typically a keyboard.

As shown in the illustration of FIG. 1, vehicle navigation systems usually employ one or more direction sensors to determine vehicle heading. Typically both a relative heading sensor, such as angular velocity sensor 14, as well as an absolute heading sensor such as geomagnetic sensor 16, are used so that the outputs of both sensors may be compared or checked for erroneous readings due to noise or environmental effects.

Figure 3:
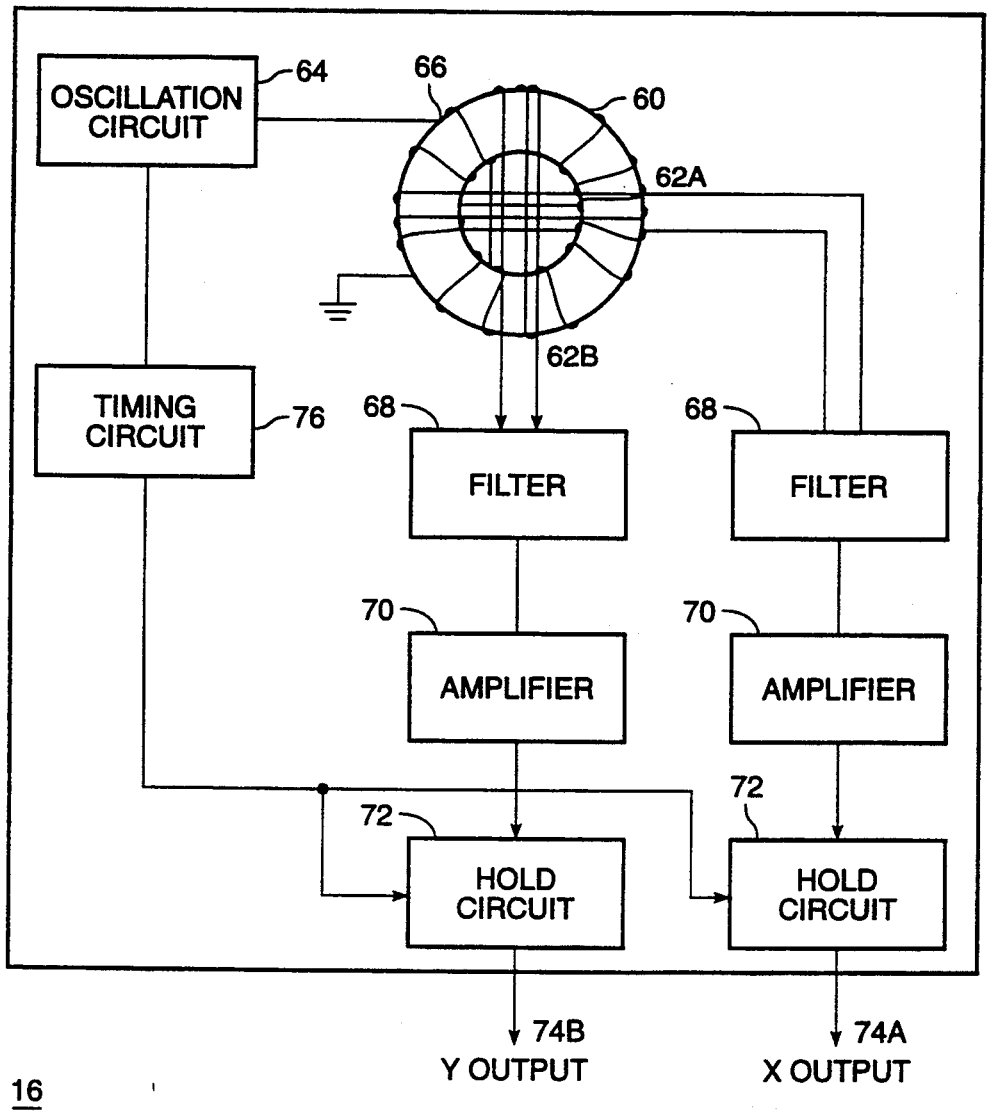
FIG. 3 is a schematic of a prior art geomagnetic sensor used in the system of FIG. 2.

FIG. 3 illustrates an exemplary embodiment of a geomagnetic sensor 16, described in detail in U.S. Pat. No. 4,672,565. The geomagnetic sensor includes a magnetic core 60 of ferromagnetic material with a pair of output windings 62A, 62B wound about the core at right angles to each other. An oscillation circuit 64 produces an electric current which is transmitted through signal winding 66 around core 60. An output proportional to a first X-component of the Earth's magnetic field produced in winding 62A, while an output proportional to a second Y- component (perpendicular to the X-component) of the Earth's magnetic field is produced in winding 62B. The output of windings 62A, 62B are filtered in filters 68, and the resultant signals amplified in amplifier circuits 70. Hold circuits 72 temporarily store the signals, which are output at outputs 74A, 74B upon a triggering signal from timing circuit 76. Thus, geomagnetic sensor 16 produces a first signal proportional to the geomagnetic field in a first "X" direction and a second output signal proportional to the geomagnetic field in a second "Y" direction, wherein the X and Y directions are perpendicular.

Figure 4:
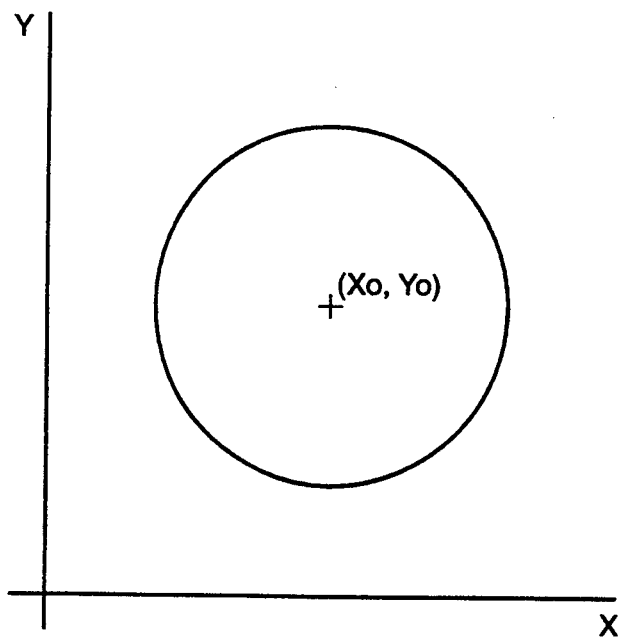
FIGS. 4-6 are diagrams of measurement curves of the geomagnetic sensor of FIG. 3.
Figure 5:
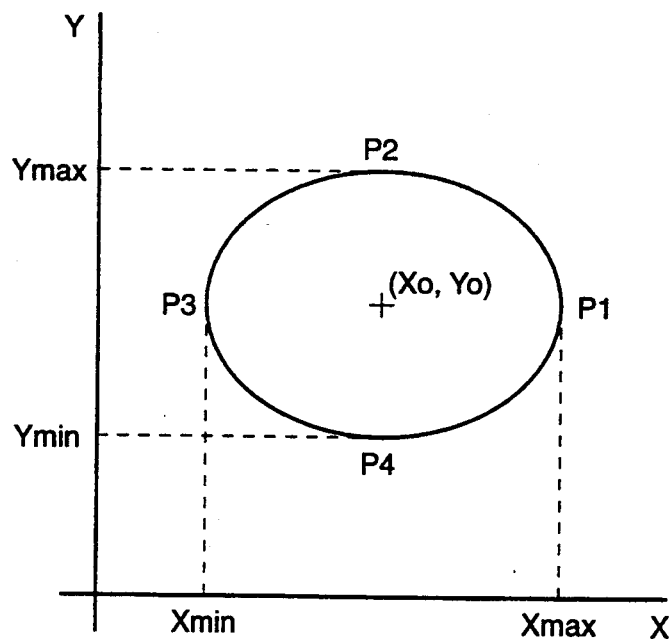
Figure 6:
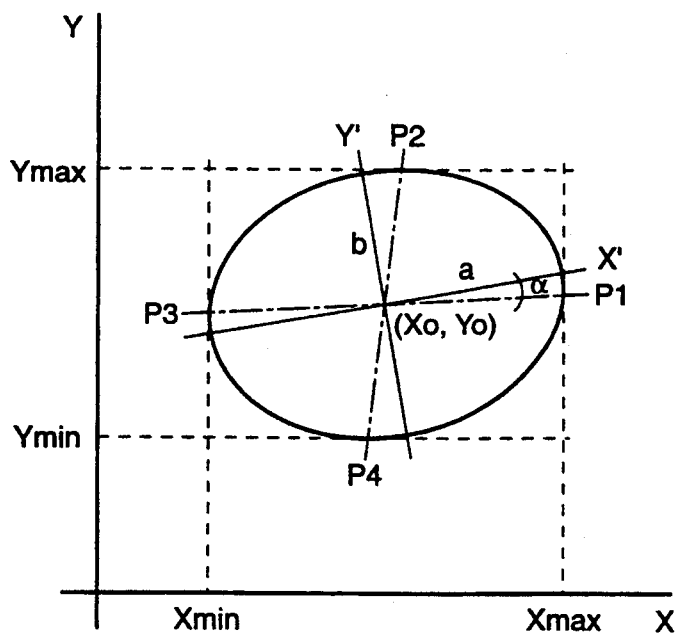

As illustrated in FIG. 4, if the Y output signal of geomagnetic sensor 16 is plotted as a function of the X output signal, the theoretical result is a circle centered at a point (X0, Y0). However, due to various factors, including local magnetic effects of the host vehicle and the non-ideal nature of the sensor itself, significant distortion can be seen in the sensor output. This distortion frequently produces an elliptical measurement curve as shown in FIG. 5, or a tilted elliptical curve as shown in FIG. 6. Therefore, the geomagnetic sensor must be calibrated in order to compensate for this distortion. Calibration results in the determination of the center and radii of such an elliptical measurement curve. Having found the center and radii, the corrected heading corresponding to a given output from the geomagnetic sensor can be determined using well-known calculations.

A relative heading sensor in a vehicle navigation system, e.g. angular velocity sensor 14, will also require periodic calibration. An angular velocity sensor will typically consist of a gyroscope, or a differential odometer coupled to the wheels of the vehicle, and produces an output signal proportional to a change in angular velocity from a reference position. Therefore, two parameters are important in determining a relative heading from such a sensor. First, a zero reading must be obtained when the vehicle is in the reference position. Secondly, the conversion constant for translating the signal output of the sensor into a change in vehicle heading must be determined. It has been found that variable environmental factors such as temperature can have a significant effect upon zero reading and conversion constant, leading to error in relative heading calculation.

The present invention provides a method and apparatus for calibrating an absolute heading sensor and a relative heading sensor which take advantage of the known angular relationship between maximum/minimum pairs on the measurement curve of the absolute heading sensor. As shown in FIG. 5, the geomagnetic sensor output signal has a maximum at point P1 and a minimum at point P3 in the X direction, and a maximum at point P2 and a minimum at point P4 in the Y direction. The angle between maximum P1 and minimum P3 or between maximum P2 and minimum P4 will always be 180°, even in the case of a tilted elliptical measurement curve, as shown in FIG. 6. The present invention utilizes the maximum/minimum pairs and this known angular relationship to calculate the characteristics of the absolute heading measurement curve, as well as the zero reading and conversion constant of the relative heading sensor.

Figure 7:
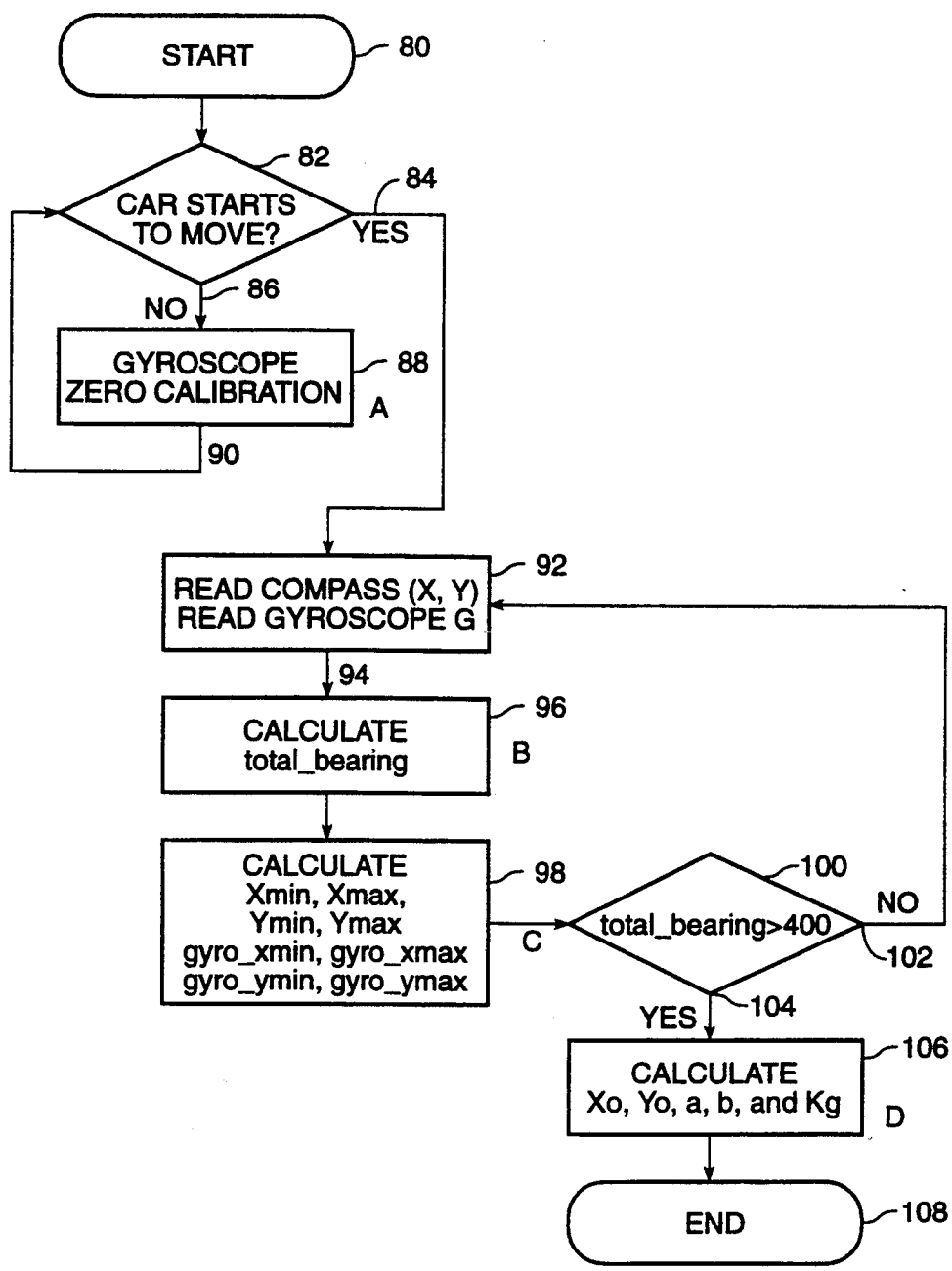

In the method of the present invention, a zero reading from the relative heading sensor, typically a gyroscope, is taken while the vehicle is standing still. Referring to FIG. 7, the vehicle is then moved in a circular path. The precise shape of the path is not important, so long as the vehicle is tending to return to its original position, such that the sensors are being rotated through at least 360°. As the vehicle moves, the X and Y outputs of the geomagnetic sensor (compass) are repeatedly sampled. At the same time, the output of the angular velocity sensor (gyroscope) is sampled. The vehicle is moved along the circular path until it has turned at least 400° as measured by the angular velocity sensor, using a predetermined, uncalibrated conversion constant. Because this conversion constant may not be accurate, the vehicle is turned at least 400° as measured by the angular velocity sensor, rather then just 360°, so as to accommodate at least a 10% error in relative heading measurement and thereby ensure that the vehicle has turned at least 360°.

As the vehicle turns, each geomagnetic sensor output signal (both X and Y) is compared with the previous value, with the greater of the two stored as a maximum and the lesser of the two stored as a minimum. When the vehicle has completed its circle, the maximum P1 and minimum P3 of the X component of the geomagnetic field, as well as the maximum P2 and the minimum P4 of the Y component of the geomagnetic field will have been found and stored.

Having found the maximum and minimum pairs, the relative heading sensor output signals corresponding to the positions of each maximum and minimum are determined. Because the angle between each maximum and minimum is known to be 180°, the difference between the relative heading signal at the maximum and the relative heading signal at the minimum is divided by 180° to obtain the conversion constant of the relative heading sensor. This may be performed for the maximum/minimum pairs in both the X and Y direction, with the resulting values averaged to arrive at a final conversion constant.

Having determined the maximum and minimum of the geomagnetic field in both directions, the measurement curve of the absolute heading sensor is also determinable. Referring to FIG. 5, for an elliptical measurement curve aligned with the X and Y axes, the center $(X_0, Y_0)$ is located at the point $(P1+P3)/2, (P2+P4)/2$. The radii of the ellipse will be $(P1-P3)/2$, and $(P2-P4)/2$, respectively. For a tilted ellipse such as that shown in FIG. 6, the coordinates of maxima P1, P2 and minima P3, P4 can be input into the well known equation discussed below for a tilted ellipse to arrive at radii a, b. Having found maxima P1, P2 and radii a, b, the angle of tilt $\alpha$ is easily determined.

The series of steps involved in the method of the present invention is illustrated in FIG. 7. The steps may be executed by means of CPU 42 and a software program stored in ROM 44. The calibration program is started by the driver of the vehicle inputting a calibration request from the user interface 34. From start point 80, the sensors are read to determine at decision step 82 whether the vehicle has started to move. If the answer to this question is no, "NO" path 86 is followed to gyroscope zero calibration step 88, wherein the gyroscope output signal is read to obtain a zero reading. Following path 90, decision step 82 is again reached, where the processor again reads the sensors to determine whether the vehicle has begun to move. Once the zero reading has been obtained, vehicle movement in a circular path may be initiated, and "YES" path 84 is followed to sensor read step 92.

At sensor read step 92, the outputs of geomagnetic sensor 16 and angular velocity sensor 14 are read, giving X and Y values for sensor 16 and corresponding angular velocity readings. Using the output of the angular velocity sensor, a total bearing is calculated in step 96 using a pre-determined conversion factor. The conversion factor may contain some error because the sensor has not yet been calibrated. This is compensated for by moving the vehicle until the angular velocity sensor indicates that it has moved through an angle of at least 400°, thereby accommodating an error in the conversion factor of at least 10%.

The current X output and Y outputs of sensor 16 are compared with the stored values (step 98), with the lesser and greater of each stored as the minimum and maximum in both the X and the Y directions. On the first pass, initial predetermined values are used for the maximum and the minimum. The angular velocity or gyroscope output signals corresponding to these minima and maxima are also stored. The processor then loops back to step 92, repeating the data collection and comparison until the vehicle has moved at least 400° (step 100).

Once the total bearing is greater than 400°, the center and radii of the absolute heading measurement curve are calculated (step 106), and the conversion constant of the relative heading sensor is calculated, as described above. The calibration of the two sensors has been accomplished without requiring specialized calibration instruments, removal of the sensors from the vehicle or pre-calibration of either sensor.

Figure 8:
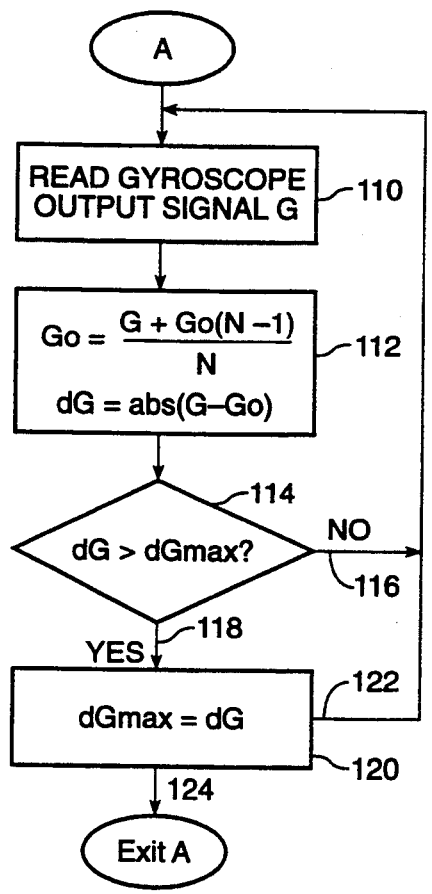

FIG. 8 illustrates the gyroscope zero calibration of step 88 of FIG. 7 in greater detail. During the zero calibration procedure, the vehicle is at a standstill. To accommodate noise in the gyroscope output, the zero reading is calculated by averaging a plurality of samples of gyroscope output. This results in a more reliable zero reading calculation. Accordingly, in step 110 the gyroscope output signal G is read for the first sample number $N=1$. In step 112, zero reading $G_0$ is calculated by adding output signal reading G to the previous zero reading value, which is given an initial value of zero for $N=0$, and the sum divided by the sample number N. At the same time, the amplitude of the noise dG in the sensor output is calculated as the absolute value of the difference between the current output signal reading and the most recent zero reading $G_0$ calculation.

At decision step 114, the current value of the noise dG is compared with a maximum noise amplitude $dG_{max}$, which is initially given an empirically predetermined value. If dG is greater than $dG_{max}$, "YES" path 118 is followed to step 120. In step 120, $dg_{max}$ is set at a new maximum noise value of dG. Path 122 is then followed to return to the beginning of the zero calibration procedure. If, on the other hand, dG is not greater than $dG_{max}$, "NO" path 116 is followed from decision step 114 to return to the beginning of the zero calibration procedure. The steps of the procedure are repeated to obtain a plurality of sensor output readings until, as shown in decision step 82 of FIG. 7, the vehicle has started to move.

Figure 9:
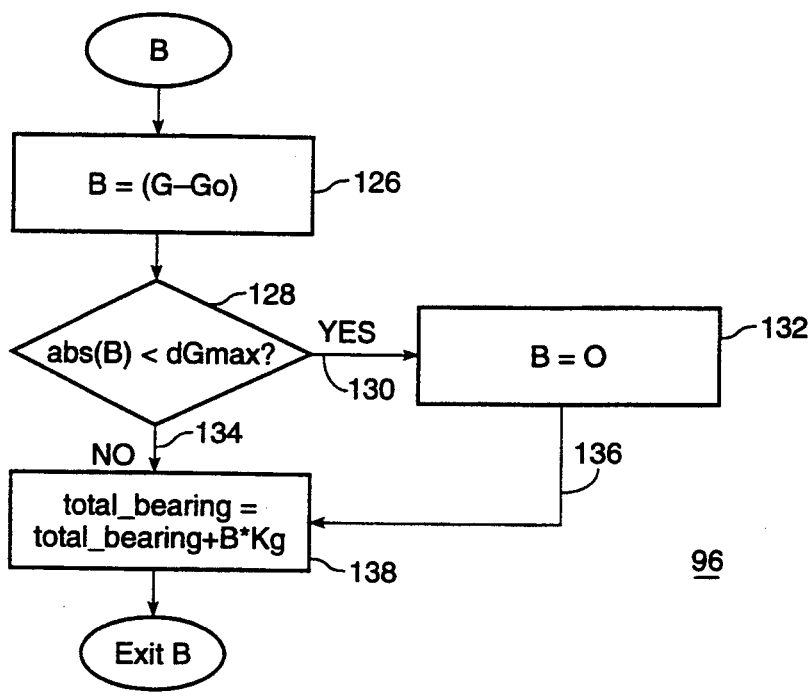

Once the vehicle starts to move, "YES" path 84 is followed in FIG. 7 from decision step 82 to step 92, where the compass and gyroscope signals are read. Then, in step 96, the total bearing is calculated. The total bearing calculation procedure is shown in greater detail in FIG. 9. As the vehicle begins to turn in a circle, the gyroscope is used to measure the angular displacement. To do this, as shown in step 126, the zero reading is first subtracted from the gyroscope output signal. At decision step 128, the absolute value of this difference B is compared to the maximum noise value $dG_{max}$. If the absolute value of the difference B is less than $dG_{max}$, the vehicle is considered to be standing still and the difference is dropped from the calculation by following "YES" path 130 to step 132, where B is set to zero. This technique of eliminating sensor readings less than the noise value $dG_{max}$ is often referred to as the "Dead-Zone" technique, and is used to prevent the accumulation of angular velocity measurement noise. If the absolute value of the difference B is not less than $dG_{max}$, "NO" path 134 is followed to step 138. Total bearing is then calculated by adding the current value for total bearing, initially set at zero, to the difference B multiplied by a pre-determined uncalibrated value for the conversion constant $K_G$. The total bearing calculated indicates the total angular rotation of the vehicle since the beginning of the calibration process.

Figure 10:
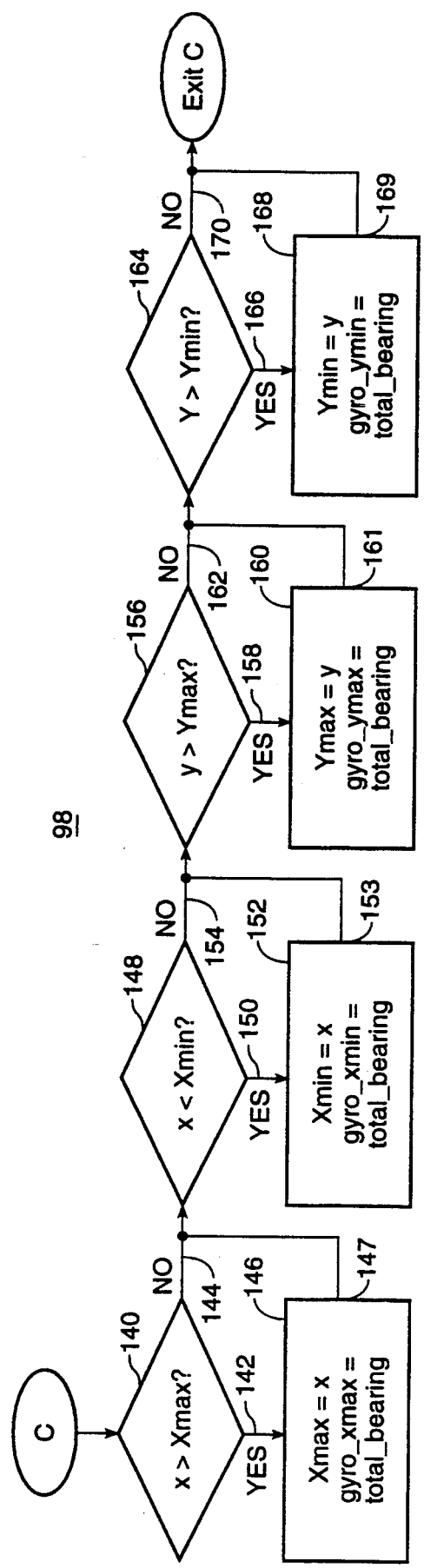

After total bearing has been calculated in step 96 of FIG. 7, the maxima and minima of the compass output, as well as the corresponding maxima and minima in the gyroscope output are calculated in step 98. The procedure is shown in FIG. 10. First, the X component of the compass signal is compared with a preset value $X_{max}$ at decision step 140, $X_{max}$ being the maximum value of the X-component of the compass output signal. If X is greater than $X_{max}$, "YES" path 142 is followed to step 146 where $X_{max}$ is assigned the value of X. Further, the corresponding value of the gyroscope output signal in this position, gyro $X_{max}$, is assigned the value of the total bearing at the position. If X is not greater than $X_{max}$, "NO" path 144 is followed from decision step 140 to decision step 148, where X is compared with a preset value for $X_{min}$, the minimum value of the X component of the compass output signal. If X is less than $X_{min}$, "YES" path 150 is followed to step 152, where $X_{min}$ is given the value of X and the corresponding value of gyro $X_{min}$ is assigned the value of the total bearing at this position.

If X is not less than $X_{min}$ at decision step 148, or if X is in fact less than $X_{min}$ and the procedure of step 152 has been followed, "NO" path 154 or path 153 are followed to decision step 156. Here, the Y value of the compass output signal is compared with a preset value of $Y_{max}$, the maximum value of the Y component of the magnetic field. If Y is greater than $Y_{max}$, "YES" path 158 is followed to step 160, where $Y_{max}$ is set at the value Y, and the corresponding value of the gyroscope, gyro $Y_{max}$, is assigned a value of the total bearing at the position. If Y is not greater than $Y_{max}$, "NO" path 162 is followed to decision step 164. The value of the Y component of the magnetic field is then compared with a preset value $Y_{min}$, the minimum value of the magnetic field in the Y direction. If Y is greater than $Y_{min}$, "YES" path 166 is followed to step 168. $Y_{min}$ is then given the value of Y, and the corresponding value of the gyro $Y_{min}$ is assigned the value of the total bearing at the position. If Y is not greater than $Y_{min}$ at decision step 164, "NO" path 170 is followed or, alternatively, path 169 is followed from step 168 to exit the procedure.

Figure 11:
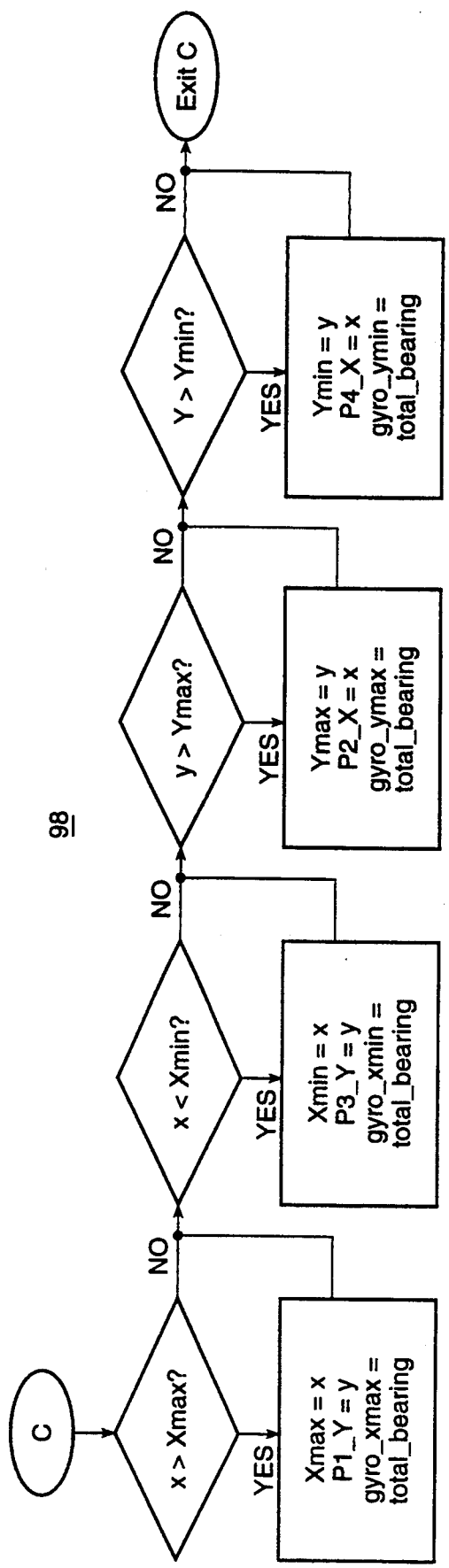

It should be noted that the procedure shown in FIG. 10 requires slight modification where the compass output measurement curve is in the shape of a tilted ellipse like that illustrated in FIG. 6. The modified procedure is shown in FIG. 11. The methodology is essentially the same as that for a non-tilted ellipse, except that for each maximum and minimum in the X and Y directions, the corresponding component in the complementary direction must be stored, shown in the figure as P1Y at $X_{max}$, P3Y at $X_{min}$, P2X at $Y_{max}$, and P4X at $Y_{min}$. P1, P2, P3 and P4 correspond to the maxima and minima points illustrated in FIG. 6. Once the coordinates ($X_{max}$, P1Y), ($X_{min}$, P3Y), (P2X, $Y_{max}$), and (P4X, $Y_{min}$) have been found, any two of these maxima or minima can be substituted into the following well-known general equation for a rotated ellipse so as to determine the radii a and b and the angle of tilt α needed for calibration:

$$\frac{[\cos\alpha(X - X_0) + \sin\alpha(Y - Y_0)]^2}{a^2} + \frac{[-\sin\alpha(X - X_0) + \cos\alpha(Y - Y_0)]^2}{b^2} = 1$$

Figure 12:
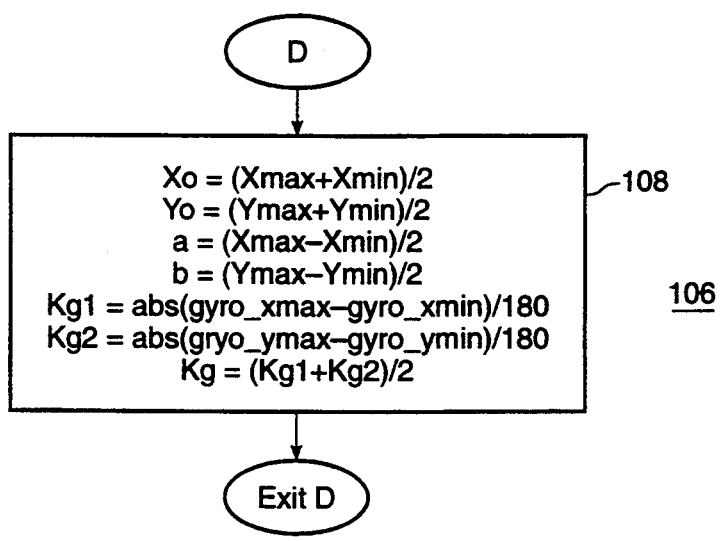
FIGS. 7-12 are flow charts showing the steps to be executed in the calibration method of the present invention.

After step 98 of FIG. 7, where $X_{min}$, $X_{max}$, $Y_{min}$, $Y_{max}$ and the corresponding values of the gyroscope output have been determined, decision step 100 of FIG. 7 is reached. At this point the total bearing is compared with a pre-determined value, which is usually set at 400°. The essential aim is to ensure that the vehicle has turned at least a full circle. Until the total bearing is greater than 400°, "NO" path 102 is followed to repeat steps 92–98. When total bearing exceeds 400°, "YES" path 104 is followed to step 106, which is illustrated in greater detail in FIG. 12. At this stage, the maxima and minima of the compass output signals are used to determine the radii and center of the compass measurement curve. Thus, as shown in step 108, the X coordinate of the center, $X_0$, is calculated by adding the maximum and minimum values of the X component of the compass output signal and dividing the sum by two. Similarly, the Y coordinate of the center is the sum of the maximum and minimum output signal in the Y direction divided by two. The radius of the curve in the X direction is the difference between the maximum and minimum in the X direction divided by two, while the radius in the Y direction is the difference between the maximum and minimum in the Y direction divided by two.

Because two maximum-minimum pairs and their angular relationship are known, two values for the conversion constant for the gyroscope can be determined. A first value $K_G1$ is the absolute value of the difference between gyro $X_{max}$ and gyro $X_{min}$ divided by 180°. The second value $K_G2$ is the absolute value of gyro $Y_{max}$- gyro $Y_{min}$ divided by 180°. These two values $K_G1$, $K_G2$ may then be averaged to arrive at a final value for the conversion constant $K_G$. This completes the calibration process.

The present invention further provides a direction sensor having means for carrying out the calibration method just described. Referring again to FIG. 2, the output signals from geomagnetic sensor 16 and angular velocity sensor 14 are received by computing means 20 at sensor/GPS interface 40. CPU 42, executing a software program stored in ROM 44, can sample sensor output data at interface 40 through data bus 50 to carry out the operations described above. The values for variables such as $G_0$, dG, $dG_{max}$, total bearing, $X_{max}$, $X_{min}$, $Y_{max}$ and $Y_{min}$, gyro $X_{max}$, etc., along with the final calibration values $X_0$, $Y_0$, a, b, $G_0$ and $K_G$ can be stored in RAM 46 or storage medium 48. The final calibration values will be retained, usually in storage medium 48, where they may be retrieved by CPU 42 and applied to the output signals of geomagnetic sensor 16 and angular sensor 14 so as to calculate vehicle heading.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims. For example, the vehicle could be turned through other than 400° during calibration, as long as it is greater than 360° by some margin. An input other than the angular rate sensor could be used to determine when 400° is accomplished, such as the driver activating an input when he has more than completed a circle.

What is claimed is:

1. A method of calibrating a relative heading sensor in a system also having an absolute heading sensor, the method comprising the steps of:
   rotating said sensors through an angle of at least 360°;
   reading said absolute heading sensor at each of a plurality of points during said rotating step;
   reading said relative heading sensor at each of said points;

finding a maximum absolute heading and a minimum absolute heading in at least a first direction;

calculating a difference between a first relative heading reading at a point corresponding to said maximum absolute heading and a second relative heading reading at a point corresponding to said minimum absolute heading;

dividing said differences by 180° to obtain a first relative heading conversion constant; and calibrating said relative heading sensor, using said first relative heading conversion constant with a third relative heading reading from said relative heading sensor to generate a calibrated relative heading.

2. The method of claim 1 further comprising the step of monitoring said relative heading sensor to detect said angle through which said sensors are rotated.

3. The method of claim 2 wherein said absolute heading sensor comprises a geomagnetic field sensor, said geomagnetic field sensor capable of measuring a geomagnetic field in said first direction and in a second direction perpendicular to said first direction, and producing first and second output signals proportional to said geomagnetic field in said first and second directions, wherein said maximum and minimum absolute headings comprise a first maximum and first minimum in said first output signal.

4. The method of claim 3 further comprising calibrating said geomagnetic field sensor contemporaneously with calibrating said relative heading sensor, said calibrating of said geomagnetic field sensor comprising the steps of:

finding a second maximum and a second minimum in said second output signal; and locating the center of a measurement curve of said geomagnetic field sensor relative to a predetermined origin, said measurement curve being defined by said second output signal as a function of said first output signal when the geomagnetic sensor is rotated about 360°, said center being defined by $X_0 = (X_{max} + X_{min})/2$ $Y_0 = (Y_{max} + Y_{min})/2$ wherein $X_0$ is the first output signal at the center, $Y_0$ is the second output signal at the center, $X_{max}$ is the first maximum, $X_{min}$ is the first minimum, $Y_{max}$ is the second maximum and $Y_{min}$ the second minimum.

5. The method according to claim 4, further comprising:

determining a first and a second radius of said measurement curve, said measurement curve being elliptical, said first and second radii being defined as $a = (X_{max} - X_{min})/2$ $b = (Y_{max} - Y_{min})/2$ wherein a is the first radius and b is the second radius; and employing said center of said measurement curve and said first and second radii with said first and second output signals to generate a calibrated absolute heading.

6. The method according to claim 5 further comprising determining an absolute heading equal to the angle between a predetermined direction and a first line connecting said center and the point (X,Y), wherein X is said first output signal and Y is said second output signal.

7. The method according to claim 1 further comprising the steps of:

finding a second maximum absolute heading and a second minimum absolute heading in a second direction;

finding a second relative heading conversion constant by calculating a second difference between a fourth relative heading reading at a point corresponding to said second maximum and a fifth relative heading reading at a point corresponding to said second minimum, said second relative heading conversion constant being said second difference divided by 180°; and employing said second relative heading conversion constant with said third relative heading reading from said relative heading sensor to generate said calibrated relative heading.

8. The method according to claim 7 further comprising the steps of:

averaging said first and second relative heading conversion constants to generate a final relative heading conversion constant; and employing said final relative heading conversion constant with said third relative heading reading from said relative heading sensor to generate said calibrated relative heading.

9. The method according to claim 1 further comprising taking a reference relative heading reading from said relative heading sensor in a stationary position before said step of rotating to obtain a zero reading.

10. The method according to claim 9 further comprising subtracting said zero reading from output signals of said relative heading sensor to obtain said third relative heading reading, and applying said first relative heading conversion constant to said third relative heading reading to obtain said calibrated relative heading.

11. The method of claim 1 wherein said relative heading sensor comprises a gyroscope.

12. A method of calibrating a direction sensor, said direction sensor having a relative heading sensor and a geomagnetic sensor, said geomagnetic sensor producing a first output signal proportional to the geomagnetic field in an X-direction and a second output signal proportional to the geomagnetic field in a Y-direction, said X and Y directions being perpendicular, the method comprising the steps of:

rotating said sensors through an angle of at least 360°;

reading said geomagnetic sensor at each of a plurality of points about said angle;

reading said relative heading sensor at each of said points;

finding a first maximum and a first minimum heading in said first output signal;

finding a second maximum and a second minimum heading in said second output signal;

calculating a first difference between a first relative heading reading at a point corresponding to said first maximum and a second relative heading reading at a point corresponding to said first minimum;

dividing said first difference by 180° to obtain a first relative heading conversion constant;

locating the center of a measurement curve of said geomagnetic sensor relative to a predetermined origin, said measurement curve being defined by said second output signal as a function of said first output signal when the geomagnetic sensor is rotated about 360°, said center being at the point ($X_0$, $Y_0$) wherein $X_0 = (X_{max} + Y_{min})/2$ $Y_0 = (Y_{max} + Y_{min})/2$ and wherein $X_0$ is the first output signal at the center, $Y_0$ is the second output signal at the center, $X_{max}$ is the first maximum, $X_{min}$ is the first minimum, $Y_{max}$ is second maximum and $Y_{min}$ the second minimum;

determining a first and a second radius of said measurement curve, said first and second radii being defined as $a = (X_{max} - Y_{min})/2$ $b = (Y_{max} - Y_{min})/2$ wherein a is the first radius and b is the second radius;

calibrating said relative heading sensor, using said first relative heading conversion constant with a third relative heading reading from said relative heading sensor to generate a calibrated relative heading; and employing said center of said measurement curve and said first and second radii with said first and second output signals to generate a calibrated absolute heading.

13. The method according to claim 12 further comprising taking a reference relative heading reading from said relative heading sensor in a stationary position before said step of rotating to obtain a zero reading.

14. The method according to claim 12 further comprising:

calculating a second difference between a fourth relative heading reading at a point corresponding to said second maximum and a fifth relative heading reading at a point corresponding to said second minimum;

dividing said second difference by 180° to obtain a second relative heading conversion constant;

averaging said first and second relative heading conversion constants to obtain a final relative heading conversion constant; and employing said final relative heading conversion constant with said third relative heading reading from said relative heading sensor to generate said calibrated relative heading.

* * * * *